(12) United States Patent
Watarai et al.

(10) Patent No.: US 7,441,842 B2
(45) Date of Patent: Oct. 28, 2008

(54) BICYCLE HUB

(75) Inventors: Etsuyoshi Watarai, Izumi (JP); Takanori Kanehisa, Sakai (JP)

(73) Assignee: Shimano Inc., Osaka (JP)

( * ) Notice: Subject to any disclaimer, the term of this patent is extended or adjusted under 35 U.S.C. 154(b) by 257 days.

(21) Appl. No.: 11/037,357

(22) Filed: Jan. 19, 2005

(65) Prior Publication Data
US 2005/0184581 A1 Aug. 25, 2005

(30) Foreign Application Priority Data
Feb. 19, 2004 (JP) .............. 2004-043080

(51) Int. Cl.
*B60B 27/00* (2006.01)
(52) U.S. Cl. ................................. 301/110.5
(58) Field of Classification Search ... 301/110.5–110.6; 280/279, 288
See application file for complete search history.

(56) References Cited

U.S. PATENT DOCUMENTS 4,580,670 A * 4/1986 Nagano ................ 192/64
5,575,540 A 11/1996 Chi et al.
5,909,931 A * 6/1999 Tabe ..................... 301/110.5
6,371,252 B1 4/2002 Kanehisa
6,669,306 B1 12/2003 Hara et al.
7,059,686 B2 * 6/2006 Kanehisa .............. 301/110.5

FOREIGN PATENT DOCUMENTS

| DE | 102838 C | 4/1899 | |
|---|---|---|---|
| EP | 0791482 A2 * | 8/1997 | ............. 301/110.5 |
| EP | 1440818 A | 7/2004 | |
| GB | 08211-A-A.D. | 2/1914 | |
| JP | 3090251 B2 | 9/1997 | |

* cited by examiner

Primary Examiner—Jason R Bellinger
(74) Attorney, Agent, or Firm—Global IP Counselors, LLP

(57) ABSTRACT

A bicycle hub includes a hub axle, a hub body, a bearing unit and a lock member. The hub axle is configured and arranged to be non-rotatably coupled to the bicycle frame by a mounting shaft. The hub body has a generally cylindrical shape mounted adjacent to an external perimeter of the hub axle. The bearing unit is installed between the hub body and the hub axle at one axial end portion of the bicycle hub so that the hub body freely rotates with respect to the hub axle. The bearing unit includes an outer ring, an inner ring and a plurality of rolling components. The lock member is configured and arranged to retain an axial position of the outer ring of the bearing unit with respect to the hub body by locking the outer ring in one of a plurality of rotational positions.

14 Claims, 5 Drawing Sheets

BICYCLE HUB

CROSS-REFERENCE TO RELATED APPLICATIONS

This application claims priority to Japanese Patent Application No. 2004-043080. The entire disclosure of Japanese Patent Application No. 2004-043080 is hereby incorporated herein by reference.

BACKGROUND OF THE INVENTION

1. Field of the Invention

The present invention relates to a bicycle hub. More specifically, the present invention relates to a bicycle hub that is mounted on a bicycle frame with a mounting shaft which is affixed to the bicycle frame by a wrenching mechanism.

2. Background Information

In a conventional hub for a bicycle, the hub is installed in a center portion of a wheel of the bicycle. The hub is usually equipped with a hub axle and a hub body. The hub axle is non-rotatably mounted to a frame of the bicycle (for example, to a front fork of the bicycle). The hub body is mounted to an outer perimeter of the hub axle such that the hub body can freely rotate around the hub axle. More specifically, the hub is provided with a pair of bearings, which support the hub body so that the hub body can freely rotate around the hub axle. Furthermore, a pair of male screw portions are formed on axial ends of the outer perimeter of the hub axle so that the hub is mounted to the frame by a pair of nuts that engage with the screw portions at the axial ends of the hub axle. In such a conventional hub, each of the bearings is an angular-type bearing that is equipped with an outer ring and an inner ring. The outer ring includes a ball receiving surface and mounted to the inner perimeter of the hub body. The inner ring includes a ball pushing surface and is screwed into the hub axle. The bearing includes a plurality of rolling components or bearing balls that are installed between the outer ring and the inner ring at predetermined intervals in the circumferential direction of the hub.

In recent years, in order to increase the rigidity of the hub of the mountain bike for downhill use, a hub has been developed that is mounted to the suspension fork with, for example, a mounting shaft of 20 mm that passes through a hub axle as disclosed in Japanese Official Gazette for Kokai Patent No. 3090251A. The hub axle of this type of hub is usually provided with a central hole through which the mounting shaft passes. Moreover, the hub includes a cylindrical hub body that is installed on the outer perimeter of the hub axle, and a pair of rolling bearings that supports the hub body such that the hub body can freely rotate around the hub axle. With this type of hub, the hub axle is non-rotatably coupled to a suspension fork of a bicycle by mounting the mounting shaft such that the mounting shaft passes through the hub axle, and by wrenching the mounting shaft to the suspension fork by a screw at an axial end of the mounting shaft.

When using the hub disclosed in the above mentioned reference, the wrenching torque for wrenching the mounting shaft is usually specified by the manufacturers of the suspension. However, when bicycle retailers and manufacturers wrench the mounting shaft by using the specified torque in the process of mounting the hub to the suspension fork, in some cases, the working face of the bearing (the abutment state between the bearing surfaces and the bearing balls) as well as the rotation of the wheels becomes deteriorated. In other words, by wrenching the mounting shaft to mount the hub on the suspension folk with the specified torque, sometimes the bearing balls and the ball receiving surfaces and/or the ball pushing surface contact each other such that a smooth rotation of the wheel is disturbed. In such cases, the level of torque used in the process of mounting the hub to the frame has to be adjusted to a lower level so that the outer ring and the inner ring rotate with respect to each other with less resistance. In such cases, the hub cannot be mounted onto the frame by utilizing the specified torque.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

One object of the present invention is to provide a bicycle hub that is mounted to the frame by a mounting shaft passing through the hub axle in which the working face of a bearing can be maintained in a good condition in the process of mounting the hub to the frame with a specified wrenching torque.

In order to achieve the above identified and other objects of the present invention, a bicycle hub is provided that basically comprises a tubular hub axle, a hub body, a first bearing unit and a lock member. The tubular hub axle is configured and arranged to be non-rotatably coupled to a bicycle frame by a mounting shaft. The hub body is coaxially coupled on the hub axle so that the hub body is disposed radially outwardly with respect to the hub axle. The first bearing unit is disposed between the hub body and the hub axle so that the hub body freely rotates with respect to the hub axle. The first bearing unit includes a first outer ring, a first inner ring and a plurality of first rolling components. The first outer ring has a first male screw section screwed into a first axial end portion of the hub body. The first inner ring is non-rotatably coupled to the hub axle in a position with respect to the first outer ring so that the first inner ring faces the first outer ring. The first rolling components are operatively disposed between the first outer ring and the first inner ring. The lock member is configured and arranged to retain an axial position of the first outer ring of the first bearing unit with respect to the hub body by locking the first outer ring in one of a plurality of rotational positions.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
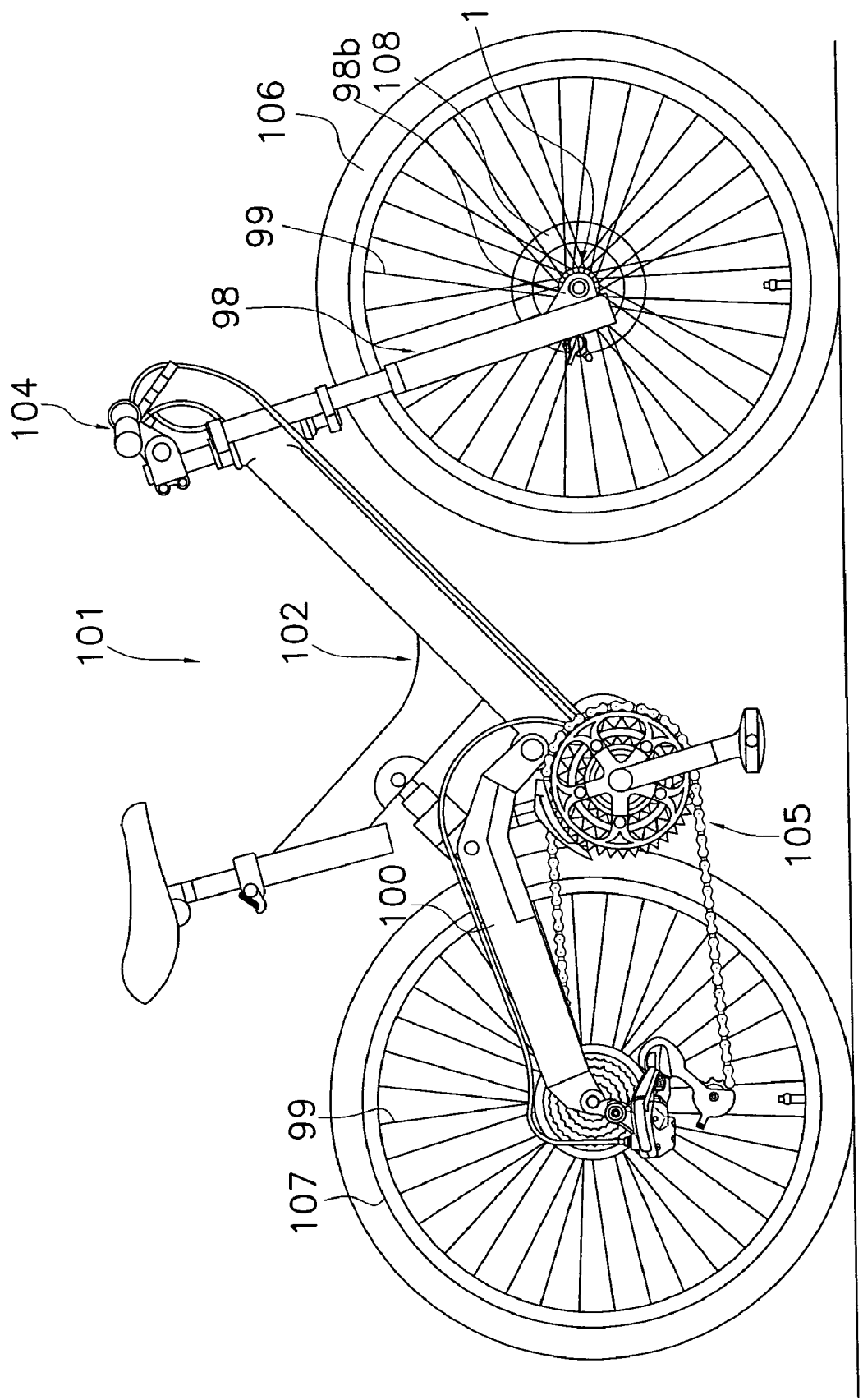
FIG. 1 is an overall right side elevational view of a bicycle provided with a front hub in accordance with one embodiment of the present invention.

Referring initially to FIG. 1, a bicycle 101 that includes a front hub 1 is illustrated in accordance with a preferred embodiment of the present invention. As seen in FIG. 1, the bicycle 101 includes a frame 102, a handle 104, a drive unit 105, a front wheel 106, a rear wheel 107, and front and rear disk brake devices (only the front disk rake device 108 is shown in FIG. 1). The front hub 1 in accordance with this embodiment of the present invention is installed at a center portion of the front wheel 106. The frame 102 includes a front suspension with a double-crown-type front suspension fork 98 and a rear suspension with a rear swing arm 100 as seen in FIG. 1. The handle 104 is fixedly coupled to the suspension fork 98. The drive unit 105 basically includes a chain, pedals, a derailleur, and other conventional parts. The front and rear wheels 106 and 107 are mounted on the suspension fork 98 and the swing arm 100, respectively. Each of the front and rear wheels 106 and 107 is provided with a plurality of spokes 99 as seen in FIG. 1.

Figure 2:
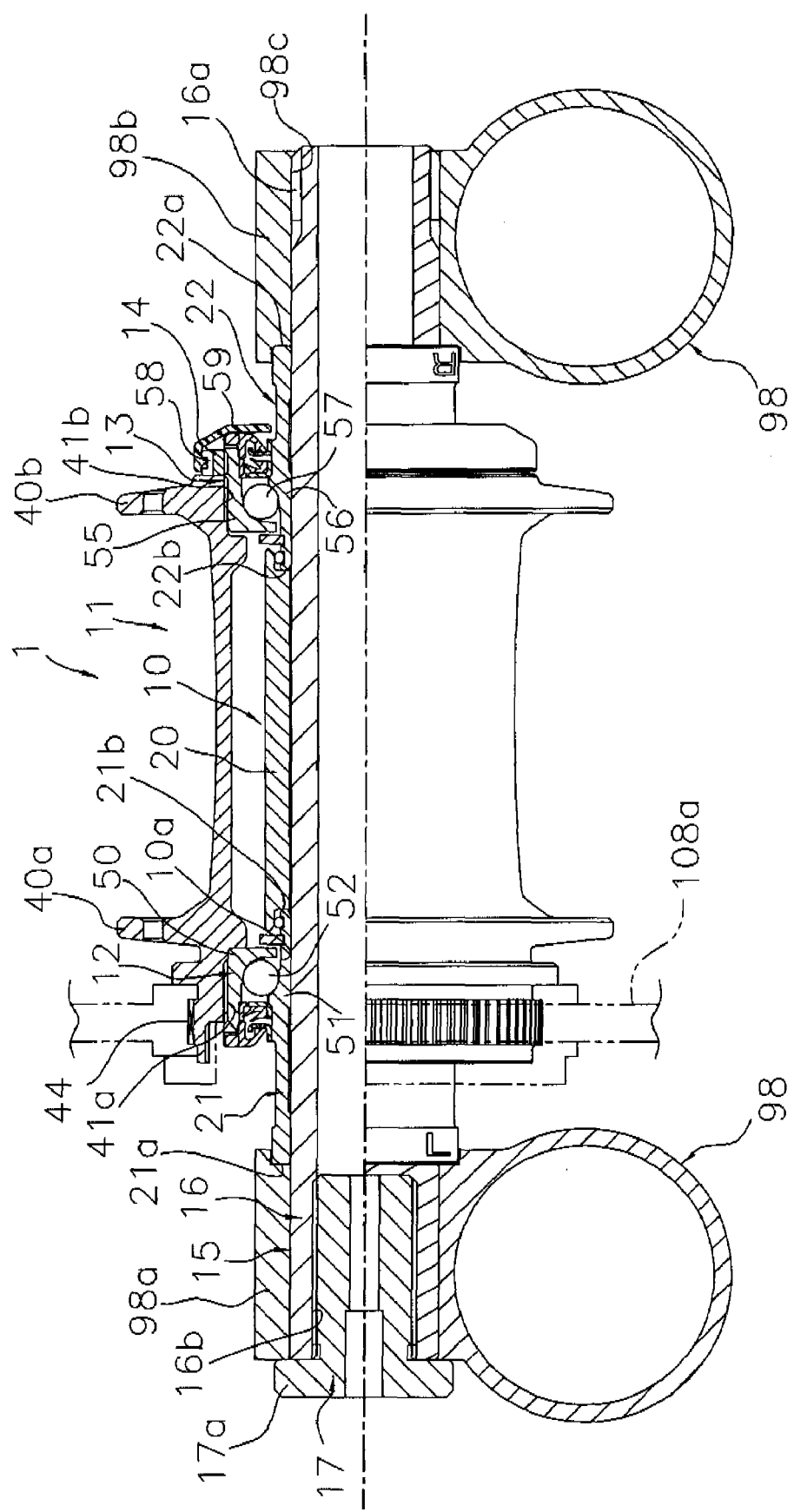
FIG. 2 is an enlarged partial cross-sectional view of the front hub of the bicycle illustrated in FIG. 1 in accordance with the one embodiment of the present invention.
Figure 3:
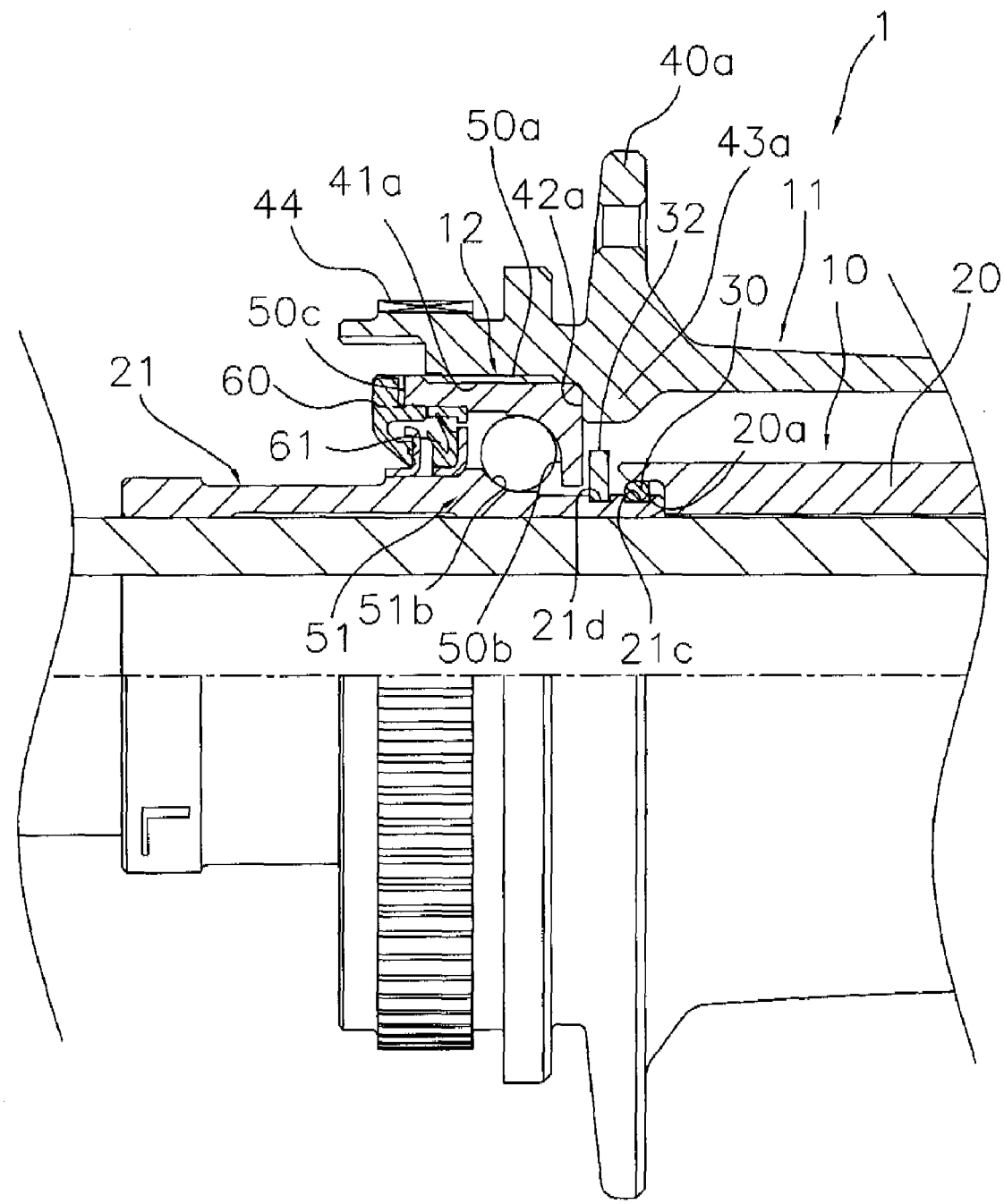
FIG. 3 is an enlarged partial cross-sectional view of the front hub illustrated in FIG. 2 showing a left side axial end portion of the front hub in accordance with the one embodiment of the present invention.
Figure 4:
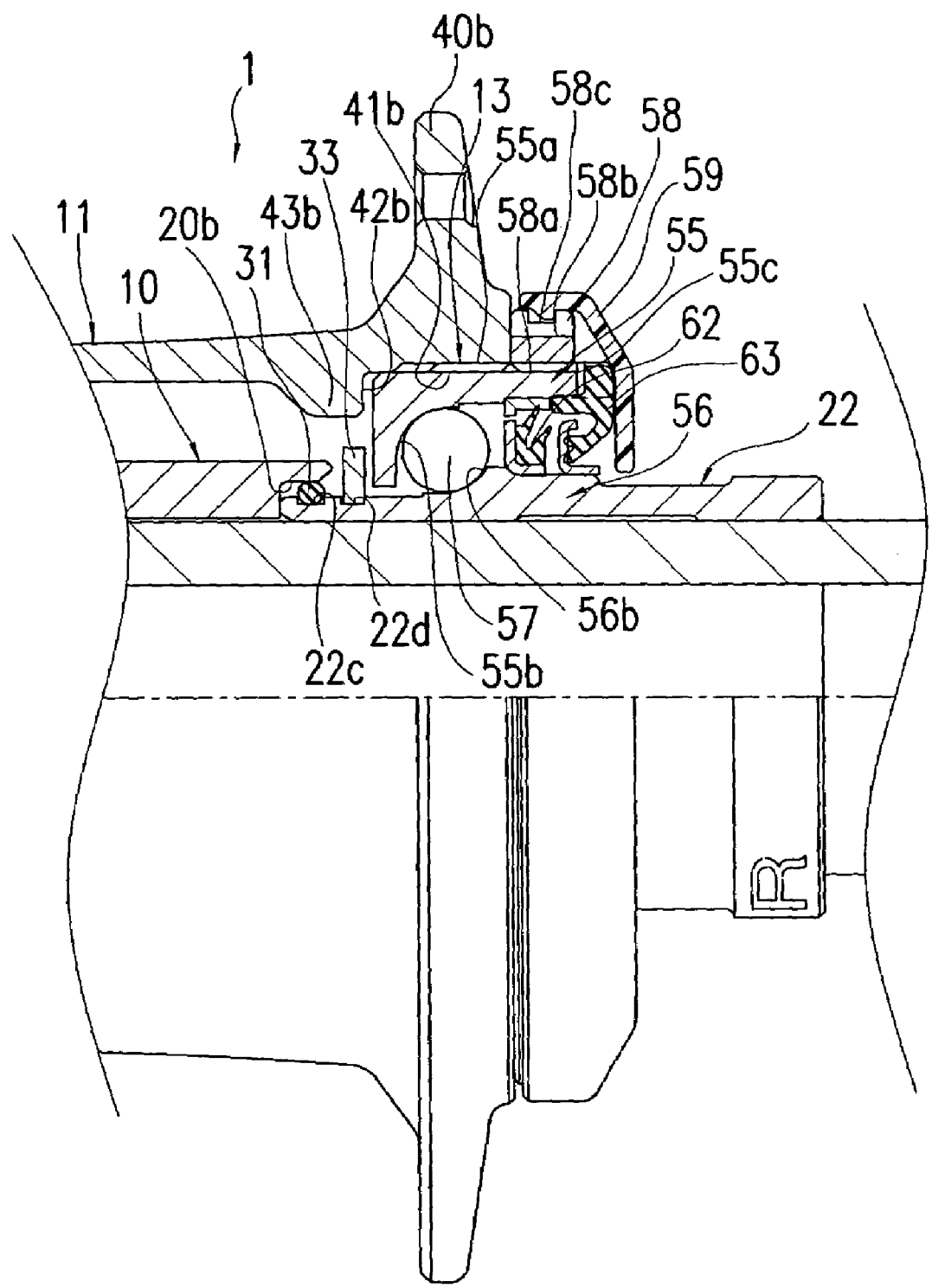
FIG. 4 is an enlarged partial cross-sectional view of the front hub illustrated in FIGS. 2 and 3 showing a right side axial end portion of the front hub in accordance with the one embodiment of the present invention.

As shown in FIGS. 2 to 4, the front hub 1 basically includes a hub axle 10, a hub body 11, and a pair of left and right bearings 12 and 13. The hub axle 10 is mounted to a pair of the shaft mounting sections 98a and 98b formed on lateral lower side portions of the suspension fork 98. The hub body 11 is coaxially installed on an outer perimeter of the hub axle 10 so that the hub body 11 is rotatable with respect to the hub axle 10. As seen in FIG. 2, the left bearing 12 and the right bearing 13 are installed between the hub axle 10 and the hub body 11 at lateral end portions of the hub body 11.

The hub axle 10 includes a central hole 10a through which a mounting shaft or mounting bolt 15 is installed for non-rotatably coupling the hub axle 10 to the suspension fork 98 between the shaft mounting sections 98a and 98b by wrenching the mounting bolt 15. The mounting bolt 15 is preferably provided as an accessory attached to the suspension fork 98. The mounting bolt 15 includes, for example, a cylindrically-shaped bolt body 16 and a head component 17 that is threadably coupled to the bolt body 16. More specifically, the bolt body 16 has a male screw part 16a on an outer perimeter of one axial end thereof that is closer to the shaft mounting section 98b so that the male screw part 16a is screwed together with a female screw part 98c formed on the shaft mounting section 98b. Moreover, the bolt body 16 includes a female screw part 16b on an inner parameter at the other axial end portion thereof that is closer to the shaft mounting section 98a so that the head component 17 is screwed into the female screw part 16b. The head component 17 includes a head 17a with a larger diameter than the bolt body 16 so that the head component 17 is fixedly coupled to the bolt body 16 and the shaft mounting section 98a as the head component 17 is screwed into the female screw part 16b. Thus, the hub axle 10 is non-rotatably supported between the shaft mounting sections 98a and 98b of the suspension fork 98 by engaging the head 17a of the head component 17 with the shaft mounting section 98a as the male screw part 16a is screwed into the shaft mounting section 98b as seen in FIG. 2.

The hub axle 10 is formed with a middle axle portion 20, a left axle portion 21, and a right axle portion 22 that are cylindrically shaped members. The middle axle portion 20 is disposed in the axial center portion of the hub axle 10. The left axle portion 21 and the right axle portion 22 are disposed at axial end portions of the middle axle portion 20 so that the left axle portion 21 and the right axle portion 22 engage with the middle axle portion 20.

As mentioned above, the middle axle portion 20, the left axle portion 21 and the right axle portion 22 are all cylindrical (tubular) components, and the central hole 10a is formed throughout the middle axle portion 20, the left axle portion 21 and the right axle portion 22 so that the mounting bolt 15 passes through the central hole 10a. The middle axle portion 20 is positioned in the axial center portion of the hub axle 10, and two annular concaved portions 20a and 20b are formed on circumferential surfaces at the axial end portions of the middle axle portion 20 as seen in FIGS. 3 and 4. Two of resilient rings such as first and second O rings 30 and 31 are provided on the annular concaved portions 20a and 20b, respectively, for preventing play. The middle axle portion 20 is configured and arranged to guide the mounting bolt 15 during the mounting process of the mounting bolt 15.

The left axle portion 21 and the right axle portion 22 are installed so that the left axle portion 21 and the right axle portion 22 engage with axial end surfaces of the annular concaved portions 20a and 20b of the middle axle portion 20, respectively. As mentioned above, the left axle portion 21 is a cylindrical component, on which a left inner ring 51 (as discussed in more detail later) of the left bearing 12 is integrally formed as a unitary one-piece member. As mentioned above, the right axle portion 22 is a cylindrical component, on which a right inner ring 56 (as discussed in more detail later) of the right bearing 13 is integrally formed as a unitary one-piece member. The left axle portion 21 and the right axle portion 22 include axial outer edges 21a and 22a, respectively, that are configured and arranged to abut against the shaft mounting sections 98a and 98b of the suspension fork 98 as seen in FIG. 2. The left axle portion 21 and the right axle portion 22 include axial inner edges 21b and 22b that mutually face each other, with a slight degree of clearance maintained from the axial edges of the middle axle portion 20. Moreover, the left axle portion 21 and the right axle portion 22 are provided with annular grooves 21c and 22c, respectively on the outer perimeters near the axial inner edges 21b and 22b so that the first and second O rings 30 and 31 are disposed in the annular grooves 21c and 22c, as shown in FIGS. 3 and 4. Furthermore, an annular groove 21d is formed on the left axle portion 21 at a position spaced from the annular groove 21c in an axial outer direction, and an annular groove 22d is formed on the right axle portion 22 at a position spaced from the annular groove 22c in an axial outer direction. A pair of first retaining ring 32 and second retaining ring 33 are provided in the annular groove 21d and the annular groove 22d, respectively, which are configured and arranged to prevent the left bearing 12 and the right bearing 13 from disassembling.

As seen in FIG. 2, the hub body 11 includes a pair of left and right hub flanges 40a and 40b on an external peripheral surface at axial end portions thereof. The spokes 99 are latched on the hub flanges 40a and 40b. Moreover, as seen in FIGS. 3 and 4, the hub body 11 includes a pair of left and right female screw portions and 41b on an internal perimeter surface at the axial end portions thereof. The inner peripheral surface of the hub body 11 also includes left and right positioning shoulders 43a and 43b at position closer to a center potion of the hub body 11 than the left and right female screw portions 41a and 41b. The left and right positioning shoulders 43a and 43b include positioning surfaces 42a and 42b for positioning the left bearing 12 and the right bearing 13, respectively. Furthermore, the outer peripheral surface of the hub body 11 near the left hub flange 40a includes a rotor mounting unit 44 (a brake mounting section), which is configured and arranged to mount the disk rotor 108a of the front disk brake 108.

As seen in FIG. 3, the left bearing 12 is installed between the hub body 11 and the hub axle 10 at one end of the hub body 11 (left end in FIG. 2) such that the hub body 11 freely rotates around the hub axle 10. The left bearing 12 includes a left outer ring or cup 50, the left inner ring or cone 51, and a plurality of bearing balls or rolling components 52 (only one rolling component 52 is shown in FIG. 3). The left outer ring 50 includes a male screw portion 50a, which is screwed into the left female screw portion 41a of the hub body 11. As mentioned above, the left inner ring 51 is integrally formed with the left axle portion 21 of the hub axle 10. The rolling components 52 are disposed between the left outer ring 50 and the left inner ring 51 in the circumferential direction at prescribed intervals. Each of the rolling components 52 are formed for example, as a spherical shape.

The left outer ring 50 has a ball receiving surface 50b that curves and faces in a generally axially outward direction. The left inner ring 51 has a ball pushing surface 51b that curves and faces in a generally direction axially inward direction. The ball receiving surface 50b and the ball pushing surface 51b constitute bearing surfaces of the left bearing 12. A length of the male screw portion 50a formed on the left outer ring 50 is preferably either the same as or shorter than the length of the left female screw portion 41a formed on the inner surface of the hub body 11. The left outer ring 50 is installed between the hub body 11 and the hub axle 10 so that the left outer ring 50 contacts with the positioning plane 42a. The left outer ring 50 further includes a tool engaging portion 50c formed on an axial outer edge surface of the left outer ring 50. The tool engaging portion 50c is configured and arranged to engage with a tool that is used to thread the left outer ring 50 into the hub body 11. For example, the tool engaging portion 50c is formed by a plurality of notches or grooves which are formed on the axial outer edge surface of the left outer ring 50 in the circumferential direction at prescribed intervals. The rolling components 52 are arranged in the circumferential direction with intervals by retainers (not shown) of the left bearing 12. Furthermore, two sealing components 60 and 61 are provided on the outer axial end of the left bearing 12 aligned in an axial direction as shown in FIG. 3.

As seen in FIG. 4, the right bearing 13 is installed between the hub body 11 and the hub axle 10 at the other end of the hub body 11 (the right end in FIG. 2) so that the hub body 11 freely rotates around the hub axle 10. The right bearing 13 includes a right outer ring or cup 55, the right inner ring or cone 56, and a plurality of bearing balls or rolling components 57 (only one rolling component 57 is shown in FIG. 4). The right outer ring 55 includes a male screw portion 55a, which is screwed into the right female screw portion 41b of the hub body 11. As mentioned above, the right inner ring 56 is integrally formed with the right axle portion 22 of the hub axle 10. The rolling components 57 are disposed between the right outer ring 55 and the right inner ring 56 in the circumferential direction at prescribed intervals. Each of the rolling components 57 are formed for example, as a spherical shape. The right outer ring 55 has a ball receiving surface 55b that curves and faces in a generally axially outward direction. The right inner ring 56 has a ball pushing surface 56b that curves and faces in a generally direction axially inward direction. The ball receiving surface 55b and the ball pushing surface 56b constitute bearing surfaces of the right bearing 13. A length of the male screw portion 55a formed on the right outer ring 55 is preferably longer than the length of the right female screw portion 41b formed on the inner surface of the hub body 11, and the right outer ring 55 is arranged to protrude outwardly beyond the hub body 11 in the axial direction as seen in FIG. 4. The right outer ring 55 is installed between the hub body 11 and the hub axle 10 so that the right outer ring 55 is spaced apart from the positioning plane 42b. The right outer ring 55 further includes a tool engaging portion 55c formed on an axial outer edge surface of the right outer ring 55. The tool engaging portion 55c is configured and arranged to engage with a tool that is used to thread the right outer ring 55 into the hub body 11. For example, similar to the tool engaging portion 50c, the tool engaging portion 55c is formed by a plurality of notches or grooves which are formed on the axial outer edge surface of the right outer ring 55 in the circumferential direction at prescribed intervals. The rolling components 57 are arranged in the circumferential direction with intervals by retainers (not shown) of the right bearing 13. Furthermore, a pair of sealing components 62 and 63 are provided on the outer axial end of the right bearing 13 aligned in an axial direction as shown in FIG. 4.

As seen in FIG. 4, a lock member 58 is threaded into the male screw portion 55a of the right outer ring 55 at an axial outer portion with respect to the hub body 11. The lock member 58 is arranged as a lock nut for retaining and locking positioning of the right outer ring 55 in the axial direction. The lock member 58 includes a female screw portion 58a on the inner perimeter thereof, which is screwed in together with the male screw portion 55a. Moreover, the lock member 58 has a tool engaging portion 58b. The tool engaging portion 58b is configured and arranged to engage with a tool that is used to thread the lock member 58 with the right outer ring 55. For example, the tool engaging portion 58b is formed by a plurality of notches or grooves which are formed on outer circumferential surface at the axial outer edge of the lock member 58 in the circumferential direction at prescribed intervals. Moreover, the lock member 58 includes the annular groove 58c on the outer circumferential surface thereof. A cover 59, which is preferably made of synthesized resin, is preferably mounted on the annular groove 58c to cover the axial edge of the hub body 11. The cover 59 has a generally dish shape, and has a central hole through which the right axle portion 22 of the hub axle 10 passes as seen in FIG. 4.

When assembling the front hub 1, structured as stated above, the rolling components 52, supported by the retainer, are first mounted onto the portion on which the left inner ring 51 of the left bearing 12 is formed on the left axle portion 21. Subsequently, the left outer ring 50 is mounted from the inside, and the first retaining ring 32 (as a detachment-prevention mechanism) and the first O ring 30 (as a play-prevention mechanism) are mounted to the annular groove 21d and the annular groove 21c, respectively. Then, the resulting assembly of the left bearing 12 is mounted to the hub body 11. Subsequently, the left outer ring 50 is screwed into the left female screw portion 41a of the hub body 11 until the left outer ring 50 comes into contact with the positioning plane 42a. Next, a tool with a similar shape as that of the mounting bolt 15 is mounted so as to penetrate through the central hole 10a of the hub axle 10, and is pressed toward the left bearing 12 while the middle axle portion 20 is mounted on the tool from the other edge of the hub body 11. Without the middle axle portion 20, the mounting bolt 15 might not be guided smoothly into the central hole 10a of the right axle portion 22 when the mounting bolt 15 is mounted from the side closer to the shaft mounting section 98a.

Then, the right bearing 13 is assembled in a similar manner to the assembly steps of the left bearing 12 as explained above. The right bearing 13, which has been assembled, is mounted to the tool so that the right bearing 13 faces the middle axle portion 20. Specifically, the male screw portion 55a of the right outer ring 55 is screwed into the right female screw portion 41b of the hub body 11. The axial position of the right outer ring 55 is then adjusted so that the working face of the left bearing 12 and the right bearing 13 (the abutment state between the rolling components 57 and the bearing surfaces) falls in a prescribed range.

When the positioning adjustment of the right outer ring 55 is completed, the lock member 58 is screwed onto the male screw portion 55a so that the rotational braking (locking the rotational position) is conducted with the right outer ring 55 in the same manner as the lock nut. This completes the assembly process of the front hub 1, in which the working face of the left bearing 12 and the right bearing 13 is adjusted so as to fall within the prescribed range. The length of the right axle portion 22 is set such that the axial inner 22b of the right axle portion 22 does not come into contact with the axial outer edge of the middle axle portion 20 at this time. Moreover, the grease is injected into the left bearing 12 and the right bearing 13. In addition, the cover 59 and the sealing components 60 to 63 are mounted after the grease is injected.

When mounting the front hub 1, which is assembled with the front wheel 106 by bicycle assemblers or bicycles retailers, to the suspension fork 98, the front hub 1 is installed between the shaft mounting sections 98a and 98b of the suspension fork 98. The mounting bolt 15 is inserted from the side of the shaft mounting section 98a, penetrating through the central hole 10a of the hub axle 10. Subsequently, the male screw part 16a formed on the axial end portion of the mounting bolt 15 is screwed into the female screw part 98c of the shaft mounting section 98b by utilizing the specified wrenching torque so that the front hub 1 is mounted to the suspension fork 98.

At this time, if the resistance from the working face of the left bearing 12 and the right bearing 13 becomes too tight and the rotation of the front wheel 106 deteriorates, the cover 59 is removed, and the lock member 58 is loosened by using a specific tool. Under such conditions, the right outer ring 55 is slightly loosened in order to adjust the working face of the left bearing 12 and the right bearing 13. Subsequently, when the axial position of the right outer ring 55 is adjusted to a position at which the working face of the left bearing 12 and the right bearing 13 becomes favorable, the lock member 58 is re-wrenched, and rotational braking is conducted with the right outer ring 55. With this procedure, the working face of the left bearing 12 and the right bearing 13 can be maintained in preferable conditions even when the front hub 1 is mounted onto the suspension fork 98 by wrenching the mounting bolt 15 while using the specified wrenching torque.

In the embodiment described above, the lock member 58 was arranged as a lock nut that is screwed into the male screw portion 55a of the right outer ring 55 so that the axial position of the right outer ring 55 is locked at a desired position. However, the lock member 58 of the present invention is not limited to such arrangement. Any structure that allows the right outer ring 55 (and/or the left outer ring 50) to be locked in one of a plurality of rotational positions to lock the axial position of the right outer ring 55 is acceptable as the lock member 58.

Figure 5:
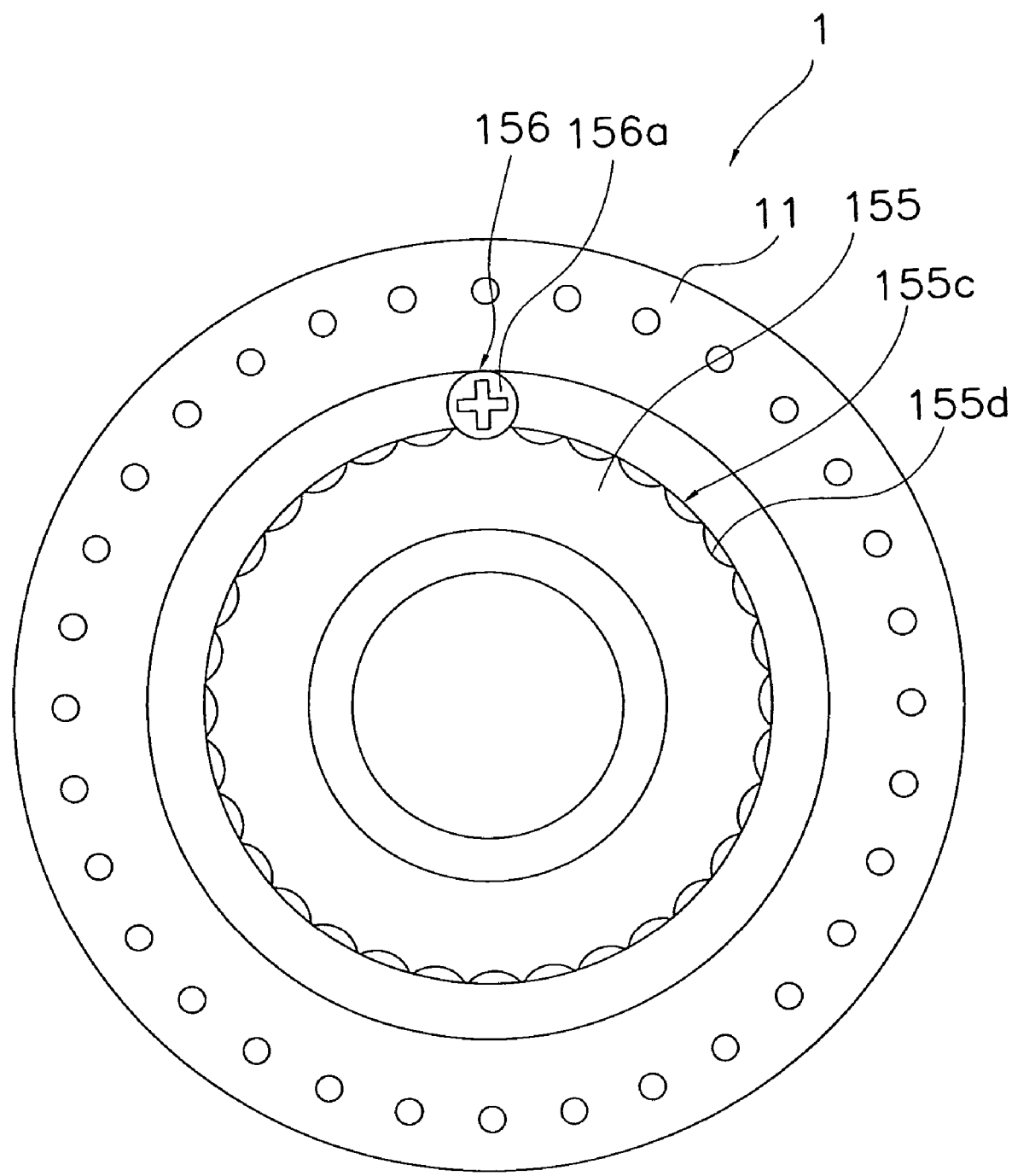
FIG. 5 is a simplified side elevational view a front hub in accordance with a modified configuration of the front hub of the one embodiment of the present invention.

For example, FIG. 5 shows a modified configuration of a right outer ring 155 in accordance with the present invention. In the right outer ring 155, the axial position is adjusted by locking the right outer ring 155 in one of a plurality of rotational positions. More specifically, the right outer ring 155 includes a screw engaging section 155c in which a plurality of circular arc shaped grooves 155d are formed on the outer circumferential surface of the right outer ring 155 in the circumferential direction at set intervals as seen in FIG. 5. The right outer ring 155 is provided with a lock member or a locking screw 156 that is screwed on the side of the hub body 11 as seen in FIG. 5. The locking screw 156 has a head portion 156a that engages with one of the grooves 155d formed in the screw engaging section 155c. Thus, the axial position of the right outer ring 155 is adjusted by changing the rotational position of the right outer ring 155, and then the right outer ring 155 is locked as the locking screw 156 engages one of the grooves 155d at the appropriate rotational position.

In the above mentioned embodiments, the front hub 1, which is mounted by the mounting bolt 15 with the male screw portion 16a on the axial end portion, was illustrated. However, the structure of the mounting shaft is not limited to this type of mounting bolt 15, but can be any structure, as long as the mounting shaft is capable of fixedly coupling the hub axle 10 through penetration of the hub axle 10 by a certain wrenching mechanism, such as the utilization of a screw for the frame.

Moreover, although the mounting bolt 15 is guided to the right axle portion 22 by installing the middle axle portion 20 in the above embodiments, the middle axle portion 20 does not need to be provided to the hub axle 10.

Furthermore, although the front hub 1 is used as the example of the present invention in the above mentioned embodiments, it will be apparent to those skilled in the art from this disclosure that the hub structure of the present invention can also be applied to the rear hub.

Accordingly, with the bicycle hub in accordance with the present invention, when the working face of the left bearing 12 and the right bearing 13 becomes deteriorated in the process of wrenching the mounting bolt 15 using the specified wrenching torque and, for example, the rotation of the front hub 1 deteriorates, the lock member 58 is temporally removed to unlock the right outer ring 55. Subsequently, the right outer ring 55 is loosened, and the axial position of the right outer ring 55 with respect to the hub body 11 is adjusted. Consequently, the working face of the left bearing 12 and the right bearing 13 is adjusted to provide a smooth rotation of the front hub 1. When the adjustment of the working face has been completed, the lock member 58 is re-mounted to lock the rotational position of the right outer ring 55 in one of the rotational positions. Thus, the working face of the left bearing 12 and the right bearing 13 is favorably adjusted and the axial position of the right outer ring 55 does not become shifted from the set position.

In the one embodiment of the present invention, by arranging the front hub 1 such that the right outer ring 55 is screwed into the hub body 11, the axial position of the right outer ring 55 can be adjusted to adjust the working face of the left bearing 12 and the right bearing 13 and the right outer ring 55 is locked in one of the rotation positions. Thus, the right outer ring 55 which have been adjusted to the best performing working face do not become shifted from the set position in the axial direction.

With the present invention, the working face of the left bearing 12 and the right bearing 13 can be adjusted with the front hub 1 being mounted to the frame of the bicycle. Thus, even when the front hub 1 is mounted by utilizing the specified wrenching torque, the working face of the left bearing 12 and the right bearing 13 can be maintained in preferable conditions.

In the one embodiment of the bicycle hub of the present invention, the lock member 58 is a lock nut which is screwed into the male screw portion 55a of the right outer ring 55. With this arrangement, the lock member 58 is rotated in the direction in which the screws of the lock member 58 are loosened to unlock the right outer ring 55 in the process of adjusting the working face of the left bearing 12 and the right bearing 13. Subsequently, the right outer ring 55 is loosened, and the axial position of the right outer ring 55 is changed. Consequently, the working face of the left bearing 12 and the right bearing 13 is adjusted. When the adjustment of the working face of the left bearing 12 and the right bearing 13 has been completed, the lock member 58 is screwed in again, and the right outer ring 55 is locked at the position in the axial direction at which the working face of the left bearing 12 and the right bearing 13 has been adjusted. Since the rotational braking (locking the rotational position) is conducted by the lock member 58 so that the right outer ring 55 can be locked in an arbitrary rotational position, the working face of the left bearing 12 and the right bearing 13 can be maintained in preferable conditions.

With the present invention, the left and right outer rings 50 and 55 are respectively equipped with the ball receiving surfaces 50b and 55b that curves and faces in a generally direction axially outward direction. The left and right inner rings 51 and 56 are respectively equipped with the ball pushing surfaces 51b and 56b that curves and faces in a generally direction axially inward direction. Since the left and right bearings 12 and 13 are the angular-type bearings, the load capacity relative to the thrust force becomes greater. Thus, the working face the bearings can be adjusted by shifting the outer rings to the outer axial direction.

With the present invention, the hub axle 10 is equipped with the left axle portion 21, the right axle portion 22 and the middle axle portion 20. The left inner ring 51 is integrally formed with the left axle portion 21, and the right inner ring 56 is integrally formed with the right axle portion 22. Both axial ends of the middle axle portion 20 are configured and arranged to be able to make contact with the left and right axle portions 21 and 22, respectively. Since the hub axle 10 is divided into three portions, the mounting shaft (mounting bolt 15) can be designed such that the mounting shaft easily passes through the hub axle, penetrating the middle axle portion 20.

With the present invention, the resilient rings (the first and second O rings 30 and 31) are provided between the left axle portion 21 and the middle axle portion 20, and between the middle axle portion 20 and the right axle portion 22. Thus, the play of the middle axle portion 20 can be controlled.

With the present invention, the left and right outer rings 50 and 55 are equipped on their axial end surfaces with the tool engaging portions 50c and 55c. Accordingly, the left and right outer rings 50 and 55 can be more easily screwed into the hub body 11 by engaging the tool with the tool engaging portions 50c and 55c. Thus, adjustment of the working face of the right outer ring 55 can be more easily conducted.

With the present invention, the lock member 58 has the annular groove 58c on the outer circumference surface so that the cover component 59 is mounted to the annular groove 58c to cover the axial edge of the hub body 11. Thus, contaminants are less likely to enter the right bearing 13 from the axial edge of the hub body 11, and the ornamental design value of the hub is increased.

With the present invention, the lock member 58 includes the tool engaging portion 58b on the axial edge surface. Thus, the lock member 58 can be more easily screwed into the right outer ring 55 by engaging the tool with the tool engaging portion 58b. Consequently, adjustment of the working face of the left bearing 12 and the right bearing 13 can be more easily conducted.

With the present invention, the hub body 11 includes a brake mounting section (the rotor mounting unit 44) that is disposed on the opposite end of the right outer ring 55 onto which the lock member 58 is mounted. Thus, the brake device can be more easily mounted onto the hub body 11.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
   a tubular hub axle configured and arranged to be non-rotatably coupled to a bicycle frame by a mounting shaft;
   a hub body coaxially coupled on the hub axle so that the hub body is disposed radially outwardly with respect to the hub axle, the hub body including a first female screw section and a first internal positioning surface that faces in an axially outward direction toward the first female screw section;
   a first bearing unit disposed between the hub body and the hub axle so that the hub body freely rotates with respect to the hub axle, the first bearing unit including:
      a first outer ring including a ball receiving surface that faces generally in the axially outward direction, a first end surface facing in an axial inward direction toward the first internal positioning surface and a first male screw section screwed into the first female screw section of the hub body, the first male screw section being disposed radially outwardly with respect to the ball receiving surface,
      a first inner ring non-rotatably coupled to the hub axle, the first inner ring including a ball pushing surface that faces generally in the axially inward direction, and
      a plurality of first rolling components operatively disposed between the first outer ring and the first inner ring; and
   a lock member configured and arranged to retain an axial position of the first outer ring of the first bearing unit with respect to the hub body by locking the first outer ring in one of a plurality of rotational positions,
   the first male screw section, the first end surface, the first internal positioning surface and the first female screw section being arranged relative to each other such that the first end surface of the first outer ring will contact the first internal positioning surface prior to the first male screw section reaching an internal terminal end of the first female screw section when threading the first male screw section into the first female screw section.

2. The bicycle hub as recited in claim 1, wherein
the lock member is a lock nut screwed onto the first male screw section of the first outer ring of the first bearing unit.

3. The bicycle hub as recited in claim 1, wherein
the first outer ring of the first bearing unit is disposed with respect to the hub body so that at least a portion of the first outer ring protrudes beyond the hub body in an axial outward direction.

4. The bicycle hub as recited in claim 1, further comprising:
a second bearing unit disposed between the hub body and the hub axle at an axial end portion of the bicycle hub that is axially spaced from the first bearing unit so that the hub body freely rotates with respect to the hub axle, the second bearing unit including:
    a second outer ring with a second male screw section screwed into a second female screw section of the hub body at an end opposite of the first outer ring,
    a second inner ring non-rotatably coupled to the hub axle, and
    a plurality of second rolling components installed between the second outer ring and the second inner ring.

5. A bicycle hub comprising:
a tubular hub axle configured and arranged to be non-rotatably coupled to a bicycle frame by a mounting shaft;
a hub body coaxially coupled on the hub axle so that the hub body is disposed radially outwardly with respect to the hub axle;
a first bearing unit disposed between the hub body and the hub axle so that the hub body freely rotates with respect to the hub axle, the first bearing unit including:
    a first outer ring with a first male screw section screwed into the hub body,
    a first inner ring non-rotatably coupled to the hub axle, and
    a plurality of first rolling components operatively disposed between the first outer ring and the first inner ring;
a second bearing unit disposed between the hub body and the hub axle at an axial end portion of the bicycle hub that is axially spaced from the first bearing unit so that the hub body freely rotates with respect to the hub axle, the second bearing unit including:
    a second outer ring with a second male screw section screwed into the hub body at an end opposite of the first outer ring,
    a second inner ring non-rotatably coupled to the hub axle, and
    a plurality of second rolling components installed between the second outer ring and the second inner ring; and
a lock member configured and arranged to retain an axial position of the first outer ring of the first bearing unit with respect to the hub body by locking the first outer ring in one of a plurality of rotational positions,
the hub axle including a first axle portion in which the first inner ring is integrally formed as a unitary one-piece member, a second axle portion in which the second inner ring is integrally formed as a unitary one-piece member, and a middle axle portion disposed between the first and second axle portions as a separate member with first and second axial end sections of the middle axle portion being disposed adjacent to the first and second axle portions, respectively.

6. The bicycle hub as recited in claim 5, wherein the hub axle further includes a first resilient ring member disposed between the first axle portion and the middle axle portion, and a second resilient ring member disposed between the second axle portion and the middle axle portion.

7. A bicycle hub comprising:
a tubular hub axle configured and arranged to be non-rotatably coupled to a bicycle frame by a mounting shaft;
a hub body coaxially coupled on the hub axle so that the hub body is disposed radially outwardly with respect to the hub axle;
a first bearing unit disposed between the hub body and the hub axle so that the hub body freely rotates with respect to the hub axle, the first bearing unit including:
    a first outer ring including a first tool engaging section formed on an axial outer end surface of the first outer ring configured and arranged to engage with a fastening tool and a first male screw section screwed into the hub body,
    a first inner ring non-rotatably coupled to the hub axle, and
    a plurality of first rolling components operatively disposed between the first outer ring and the first inner ring; and
a lock member configured and arranged to retain an axial position of the first outer ring of the first bearing unit with respect to the hub body by locking the first outer ring in one of a plurality of rotational positions.

8. A bicycle hub comprising:
a tubular hub axle configured and arranged to be non-rotatably coupled to a bicycle frame by a mounting shaft;
a hub body coaxially coupled on the hub axle so that the hub body is disposed radially outwardly with respect to the hub axle;
a first bearing unit disposed between the hub body and the hub axle so that the hub body freely rotates with respect to the hub axle, the first bearing unit including:
    a first outer ring including a first tool engaging section formed on an axial outer end surface of the first outer ring configured and arranged to engage with a fastening tool and a first male screw section screwed into the hub body,
    a first inner ring non-rotatably coupled to the hub axle, and
    a plurality of first rolling components operatively disposed between the first outer ring and the first inner ring;
a second bearing unit disposed between the hub body and the hub axle at an axial end portion of the bicycle hub that is axially spaced from the first bearing unit so that the hub body freely rotates with respect to the hub axle, the second bearing unit including:
    a second outer ring including a second tool engaging section formed on an axial outer end surface of the second outer ring configured and arranged to engage with the fastening tool and a second male screw section screwed into the hub body at an end opposite of the first outer ring,
    a second inner ring non-rotatably coupled to the hub axle, and
    a plurality of second rolling components installed between the second outer ring and the second inner ring; and a lock member configured and arranged to retain an axial position of the first outer ring of the first bearing unit with respect to the hub body by locking the first outer ring in one of a plurality of rotational positions.

9. The bicycle hub as recited in claim 4, wherein the second outer ring of the second bearing unit includes a ball receiving surface that generally faces in an axially outward direction away from the first bearing unit and the second inner ring of the second bearing unit includes a ball pushing surface that generally faces in an axially inward direction toward the first bearing unit.

10. The bicycle hub as recited in claim 1, wherein the lock member includes a tool engaging section formed on an outer peripheral surface of the lock member configured and arranged to engage with a fastening tool.

11. A bicycle hub comprising:
a tubular hub axle configured and arranged to be non-rotatably coupled to a bicycle frame by a mounting shaft;
a hub body coaxially coupled on the hub axle so that the hub body is disposed radially outwardly with respect to the hub axle;
a first bearing unit disposed between the hub body and the hub axle so that the hub body freely rotates with respect to the hub axle, the first bearing unit including:
a first outer ring with a first male screw section screwed into the hub body,
a first inner ring non-rotatably coupled to the hub axle, and
a plurality of first rolling components operatively disposed between the first outer ring and the first inner ring; and
a lock member configured and arranged to retain an axial position of the first outer ring of the first bearing unit with respect to the hub body by locking the first outer ring in one of a plurality of rotational positions,
the hub body further including a brake mounting section configured and arranged to mount a brake device on a second end portion of the hub body that is opposite from a first end portion to which the first outer ring of the first bearing unit is attached.

12. The bicycle hub as recited in claim 1, wherein
the first outer ring of the first bearing unit includes a screw engaging section with a plurality of grooves arranged on an outer peripheral surface of the first outer ring, and
the lock member is a locking screw configured to be screwed into the hub body adjacent to the first outer ring of the first bearing, the locking screw having a head portion configured and arranged to engage with one of the grooves of the screw engaging section of the first outer ring.

13. The bicycle hub as recited in claim 9, wherein
the hub body includes a second internal positioning surface that faces in the axially outward direction away from the first bearing unit at the axial end portion of the bicycle hub that is axially spaced from the first bearing unit,
the second outer ring includes a second end surface facing in the axially inward direction toward the first bearing unit, and
the second male screw section, the second end surface, the second internal positioning surface and the second female screw section being arranged relative to each other such that the second end surface of the second outer ring will contact the second internal positioning surface prior to the second male screw section reaching an internal terminal end of the second female screw section when threading the second male screw section into the second female screw section.

14. The bicycle hub as recited in claim 13, wherein
one of the first and second outer rings contacts one of the first and second positioning surfaces when the hub is fully assembled and the other of the first and second outer rings is spaced from the other of the first and second positioning surfaces when the hub is fully assembled.

* * * * *